(12) United States Patent
Okamoto

(10) Patent No.: US 11,979,539 B2
(45) Date of Patent: May 7, 2024

(54) INFORMATION PROCESSING APPARATUS AND NON-TRANSITORY COMPUTER-READABLE MEDIUM

(71) Applicant: BROTHER KOGYO KABUSHIKI KAISHA, Nagoya (JP)

(72) Inventor: Ryoko Okamoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/537,344

(22) Filed: Nov. 29, 2021

(65) Prior Publication Data
US 2022/0174178 A1     Jun. 2, 2022

(30) Foreign Application Priority Data
Nov. 30, 2020   (JP) .............................. 2020-198807

(51) Int. Cl.
     *G06F 15/00*      (2006.01)
     *H04N 1/00*      (2006.01)
     *H04N 1/34*      (2006.01)

(52) U.S. Cl.
CPC ......... *H04N 1/344* (2013.01); *H04N 1/00307* (2013.01); *H04N 1/00424* (2013.01); *H04N 1/00938* (2013.01)

(58) Field of Classification Search
CPC ............... H04N 1/344; H04N 1/00307; H04N 1/00424; H04N 1/00938
USPC ........................................................ 358/1.13
See application file for complete search history.

(56) References Cited

U.S. PATENT DOCUMENTS

2017/0344321 A1* 11/2017 Li .................... G06F 3/1292
2018/0262477 A1   9/2018 Saito
2021/0056552 A1* 2/2021 Murray ............. G06Q 20/3274
2021/0306473 A1* 9/2021 Inouye ............... H04N 1/00143

FOREIGN PATENT DOCUMENTS

JP      2018-151700 A     9/2018

* cited by examiner

*Primary Examiner* — Mark R Milia
(74) *Attorney, Agent, or Firm* — KENEALY VAIDYA LLP

(57) ABSTRACT

An information processing apparatus includes a controller configured to: receive a function purchase instruction of an image forming apparatus and based on receiving the function purchase instruction, provide a mobile terminal with execution information, the execution information being for causing the mobile terminal to download a target application and to execute the target application, the target application being an application software for purchasing a function of the image forming apparatus.

17 Claims, 5 Drawing Sheets

| PRINTER NAME | MFC-XXXX_123456_AAA | | |
|---|---|---|---|
| FUNCTION | CLOUD STORAGE | SUPPORTED/ NOT SUPPORTED | PURCHASED/ NOT PURCHASED |
| | CLOUD STORAGE | SUPPORTED | NOT PURCHASED |
| | COLOR PRINTING | SUPPORTED | NOT PURCHASED |
| | XXXX | SUPPORTED | NOT PURCHASED |

INFORMATION PROCESSING APPARATUS AND NON-TRANSITORY COMPUTER-READABLE MEDIUM

CROSS-REFERENCE TO RELATED APPLICATIONS

This application is based upon and claims the benefit of priority from prior Japanese patent application No. 2020-198807 filed on Nov. 30, 2020, the entire contents of which are incorporated herein by reference.

TECHNICAL FIELD

The present disclosure relates to an information processing apparatus, and an application software for a mobile terminal.

BACKGROUND

A related art discloses technology of purchasing a function of an image forming apparatus by a user and activating the purchased function. Specifically, in a related-art system, the user selects a function on a terminal device, which can be executed by the image forming apparatus. Then, billing processing is executed, and the terminal device receives a code from a server. Then, when the user inputs the code into the image forming apparatus, the function of the image forming apparatus is activated.

SUMMARY

One illustrative aspect of the present disclosure provides an information processing apparatus including a controller. The controller is configured to: provide the mobile terminal with support function information and purchase information, the support function information indicating a function supported by the image forming apparatus, the purchase information indicating a purchase status of a function of the image forming apparatus, and the support function information and the purchase information being used in a case a function supported by the image forming apparatus and a not-purchased function of the image forming apparatus are displayed in the target application.

According to the above configuration, it is possible to provide a novel method regarding a method of purchasing the function of the image forming apparatus.

Another illustrative aspect of the present disclosure provides a non-transitory computer-readable medium storing a computer program readable by a computer of a mobile terminal. The computer program, when executed by the computer, causes the mobile terminal to perform: based on an image forming apparatus receiving a function purchase instruction, receiving execution information from an information processing apparatus, the execution information being for causing the mobile terminal to download an application software for the mobile terminal and to execute the application software, the application software being for purchasing a function of the image forming apparatus; and on a condition that the execution information has been received from the information processing apparatus, downloading and executing the application software.

According to the above configuration, it is possible to achieve the similar effects to the information processing apparatus.

BRIEF DESCRIPTION OF DRAWINGS

Illustrative embodiments of the disclosure will be described in detail based on the following figures, wherein.

DETAILED DESCRIPTION

Illustrative aspects of the present disclosure provide a novel method regarding a method of purchasing a function of an image forming apparatus.

Hereinafter, an illustrative embodiment of the present disclosure will be described with reference to the drawings.

1. Configuration

Figure 1:
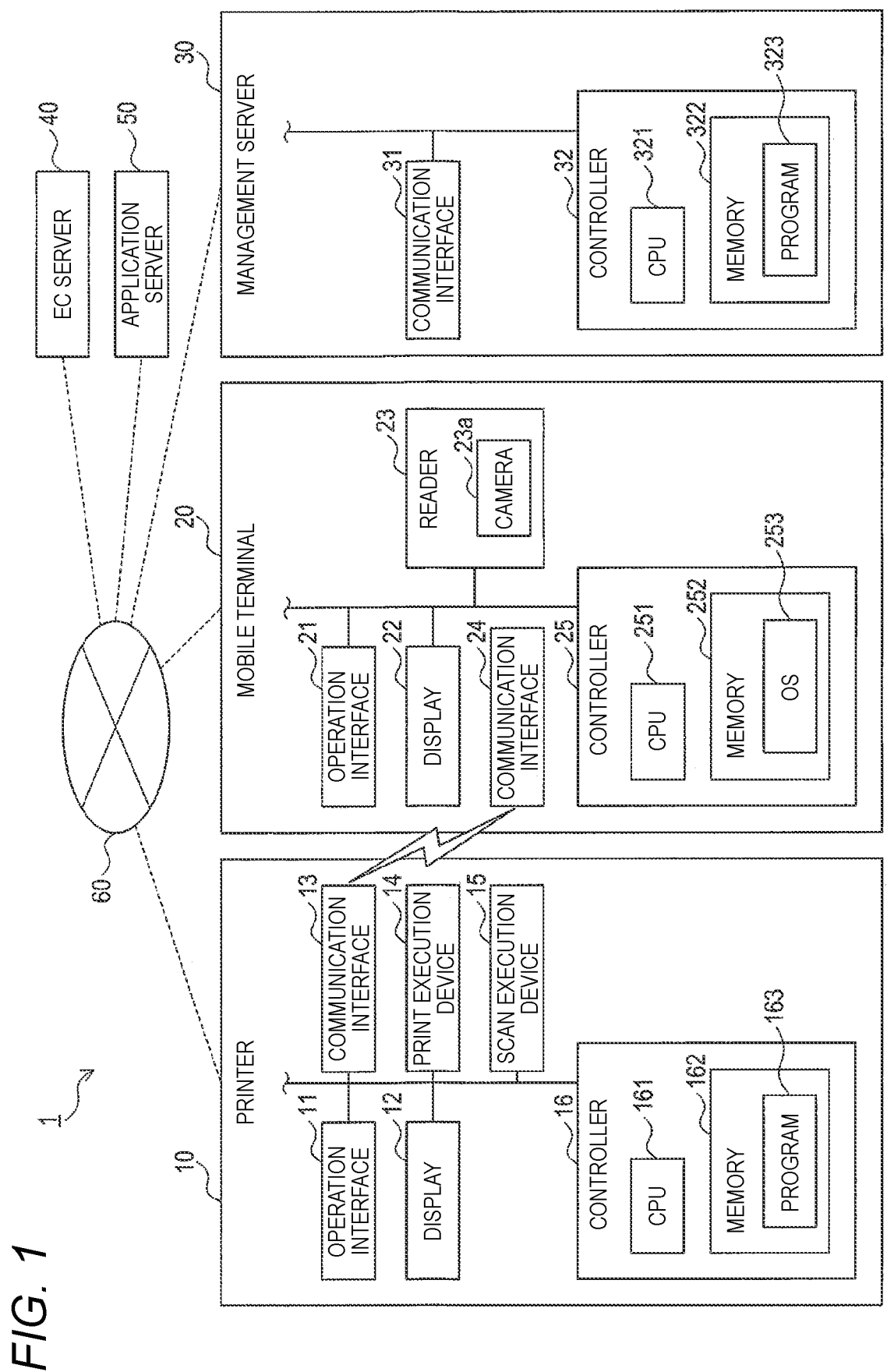
FIG. 1 is a block diagram showing a configuration of a communication system.

As shown in FIG. 1, a communication system 1 includes a printer 10, a mobile terminal 20, a management server 30, an EC (Electronic. Commerce) server 40, and an application server 50. The management server 30, the EC server 40 and the application server 40 are equipped on the Internet 60. Each of the devices 10, 20, 30, 40 and 50 can communicate with each other via the Internet 60. Note that, the communication system 1 generally includes a plurality of printers 10 and mobile terminals 20. However, for convenience, FIG. 1 shows one printer 10 and one mobile terminal 20.

{Printer}

The printer 10 is an image forming apparatus that can form an image on a printing medium. The printer 10 includes an operation interface 11, a display 12, a communication interface 13, a print execution device 14, a scan execution device 15, and a controller 16.

The operation interface 11 includes a plurality of keys. A user can input a variety of instructions to the printer 10 by operating the operation interface 11.

The display 12 is a display for displaying a variety of information. The display 12 is also configured to function as a so-called touch panel. Specifically, the display 12 is also configured to function as an operation interface that is operated by the user. In the below, the operation interface 11 and the operation interface that is implemented by the display 12 are collectively referred to as 'operation interface 11'.

The communication interface 13 is a communication interface for connecting the printer 10 to the Internet 60. The communication interface 13 also has a communication interface for performing short-range wireless communication. Examples of the short-range wireless communication include wireless communication according to communication standards of Bluetooth (registered trademark) (hereinafter, referred to as 'BT'), wireless communication according to communication standards of Bluetooth Low Energy (hereinafter, referred to as 'BLE'), wireless communication according to communication standards of NFC, and the like. The printer 10 is configured to perform wireless communication with devices such as the mobile terminal 20 by using the short-range wireless communications. Note that, 'Bluetooth' is a registered trademark. In addition, 'NFC' is an abbreviation of 'Near Field Communication'.

The print execution device 14 is configured to implement a print function. Specifically, the print execution device 14 has a printing mechanism of inkjet technology or electrophotographic technology. The print execution device 14 can print an image based on image data on a printing medium by using the printing mechanism.

The scan execution device 15 is a scan mechanism such as CCD (abbreviation of Charge-Coupled Device), CIS (abbreviation of Contact Image Sensor) and the like.

The controller 16 includes a CPU (abbreviation of Central Processing Unit) 161 and a memory 162. The CPU 161 is a processor configured to execute a variety of processing according to a program 163 stored in the memory 162. The memory 162 is configured by a RAM (abbreviation of Random Access Memory), a ROM (abbreviation of Read Only Memory) and the like.

In the present illustrative embodiment, it is assumed that the printer 10 is sold in a state where an executable function is restricted. Specifically, the printer 10 is sold in a function-restricted state such as states where only a print function is enabled, only a monochrome printing function is enabled, only a predetermined number of sheets (for example, only 100 sheets) can be printed, and the like. Due to the function restrictions, it is assumed that the printer 10 is sold at a lower price than a normal printer (i.e., a printer without function restrictions). After purchasing the printer 10, the user additionally purchases necessary functions among functions of the printer 10. Examples of the functions that are additionally purchased include, for example, a color printing function, a cloud storage function, and the like. In a case where the printer 10 has a restriction on a printable number of sheets, a function of additionally purchasing the printable number of sheets may also be exemplified. Note that, the cloud storage function is a function of storing scan data generated by the printer 10 in an external server on the Internet 60. In addition, the purchase of the function of the printer 10 is a concept different from purchase of consumables such as inks and sheets.

{Mobile Terminal}

The mobile terminal 20 is an information device that is carried by the user. The mobile terminal 20 is, for example, a smart phone, a tablet terminal, and the like. The mobile terminal 20 includes an operation interface 21, a display 22, a reader 23, a communication interface 24, and a controller 25.

The operation interface 21 includes a plurality of keys. The user can input a variety of instructions to the mobile terminal 20 by operating the operation interface 21.

The display 22 is a display for displaying a variety of information. The display 22 is also configured to function as a so-called touch panel. Specifically, the display 22 is configured to function as an operation interface that is operated by the user. In the below, the operation interface 21 and the operation interface that is implemented by the display 22 are collectively referred to as 'operation interface 21'.

The reader 23 includes a camera 23a, and is configured to read code information from an image obtained by the camera 23a. The code information is a coded version of information. The code information includes a two dimensional code such as a QR Code, one dimensional code such as a barcode, and the like. Note that, 'QR Code' is a registered trademark of DENSO WAVE INCORPORATED.

The communication interface 24 is a communication interface for connecting the mobile terminal 20 to the Internet 60. The communication interface 24 also has a communication interface for performing short-range wireless communication. Examples of the short-range wireless communication include wireless communications according to communication standards of BT, BLE, NFC, and the like.

The mobile terminal 20 is configured to perform wireless communication with devices such as the printer 10 by using the short-range wireless communications.

The controller 25 includes a CPU 251 and a memory 252. The CPU 251 is a processor configured to execute a variety of processing according to an OS (Operating System) and the like stored in the memory 252. The memory 252 is configured by a RAM, a ROM and the like. In the present illustrative embodiment, the OS 253 is iOS (registered trademark) of Apple Inc.

{Management Serener}

The management server 30 is a server that is equipped on the Internet 60 by a vendor of the printer 10 and is configured to manage functions of the printer 10. The management server 30 includes a communication interface 31 and a controller 32. The communication interface 31 is a communication interface for connecting the management server 30 to the Internet 60.

The controller 32 includes a CPU 321 and a memory 322. The CPU 321 is configured to execute a variety of processing according to a program 323 stored in the memory 322. The memory 322 is configured by a RAM, a ROM, a hard disk and the like.

{EC Server}

The EC Server 40 is equipped on the Internet 60 by a business operator (for example, Apple Inc.) different from the vendor of the printer 10. The EC Server 40 is a server configured to execute e-commerce for providing a variety of functions to the printer 10, in response to an instruction from the user. The vendor of the printer 10 registers in advance sale information of functions of the printer in the EC Server 40. The sale information includes information indicative of each function of the printer, information about prices of each function, and the like.

{Application Server}

The application Server 50 is equipped on the Internet 60 by a business operator (for example, Apple Inc.) different from the vendor of the printer 10. The application server 50 is a server configured to deliver a mobile application designated from the user via the mobile terminal 20 to the mobile terminal 20.

Here, an outline of a method of additionally purchasing a function of the printer 10 in the communication system 1 of the present illustrative embodiment is described.

In the communication system 1 of the present illustrative embodiment, the user additionally purchases a function of the printer 10 by using 'App Clips'.

Here, 'App Clips' is a function of providing a part of a function of an application at a place where the user wants the application when the user wants the same, without downloading the application. That is, 'App Clips' of any mobile application is a mini application provided by separating the part of the function of the mobile application. 'App Clips' is a relatively low-capacity (for example, 10 MB or smaller) application. Accordingly, the user can download 'App Clips' in a short time when the use wants the same, and use a part of a function of a full application (a usual complete application), without downloading the full application. Note that, 'App Clips' is uploaded in advance in the application server 50, together with the fill application.

'App Clips' is started up as follows, for example. First, a start-up condition for 'App Clips' is satisfied. As the start-up condition, a variety of conditions such as a condition that predetermined code information is read by the mobile terminal 20 and a condition that predetermined information is received via the short-range wireless communication may be exemplified. When the start-up condition is satisfied, a predetermined screen (hereinafter, referred to as 'start-up screen') referred to as 'Clip Card' is displayed on the display of the mobile terminal. In 'Clip Card', an outline of the function that is provided by 'App Clips' and a button (hereinafter, referred to as 'start-up button') for downloading and executing 'App Clips' are displayed. When the start-up button is operated, downloading of 'App Clips' is started and 'App Clips' is started up.

Note that, 'App Clips' and 'Clip Card' are uploaded in advance in the application server 50, together with the full application. When the start-up condition is satisfied, the mobile terminal 20 accesses the application server 50 and obtains 'Clip Card' and 'App Clips' from the application server 50.

Note that, the above start-up flow is executed when the full application has not been downloaded in the mobile terminal 20. When the start-up condition is satisfied in a state where the full application is downloaded in the mobile terminal 20, the full application is started up.

In the communication system 1 of the present illustrative embodiment, the vendor of the printer 10 provides a mobile application MA (hereinafter, referred to as 'main application') that is the full application. The mobile application MA is an application for causing the printer 10 to execute a predetermined function. The functions that are provided by the mobile application MA include a purchase function of additionally purchasing a function of the printer 10. The user can use the purchase function that is one function of the main application by downloading 'App Clips' (hereinafter, also referred to as 'target application') TA of the mobile application MA. The user can additionally purchase a function of the printer 10 without downloading the mobile application MA that is the full application. Incidentally, the target application is an application software (hereinafter, referred to as 'application') for purchasing a function of the image forming apparatus.

Note that, the mobile application MA includes a mobile print function, a mobile scan function and the like, in addition to the purchase function. The mobile print function is a function of transmitting image data from the mobile terminal to the printer 10 to thereby cause the printer 10 to print an image indicated by the image data. The mobile scan function is a function of transmitting a document reading instruction from the mobile terminal to the printer 10 to thereby cause the printer 10 to execute the scan function.

2. Processing

Figure 2:
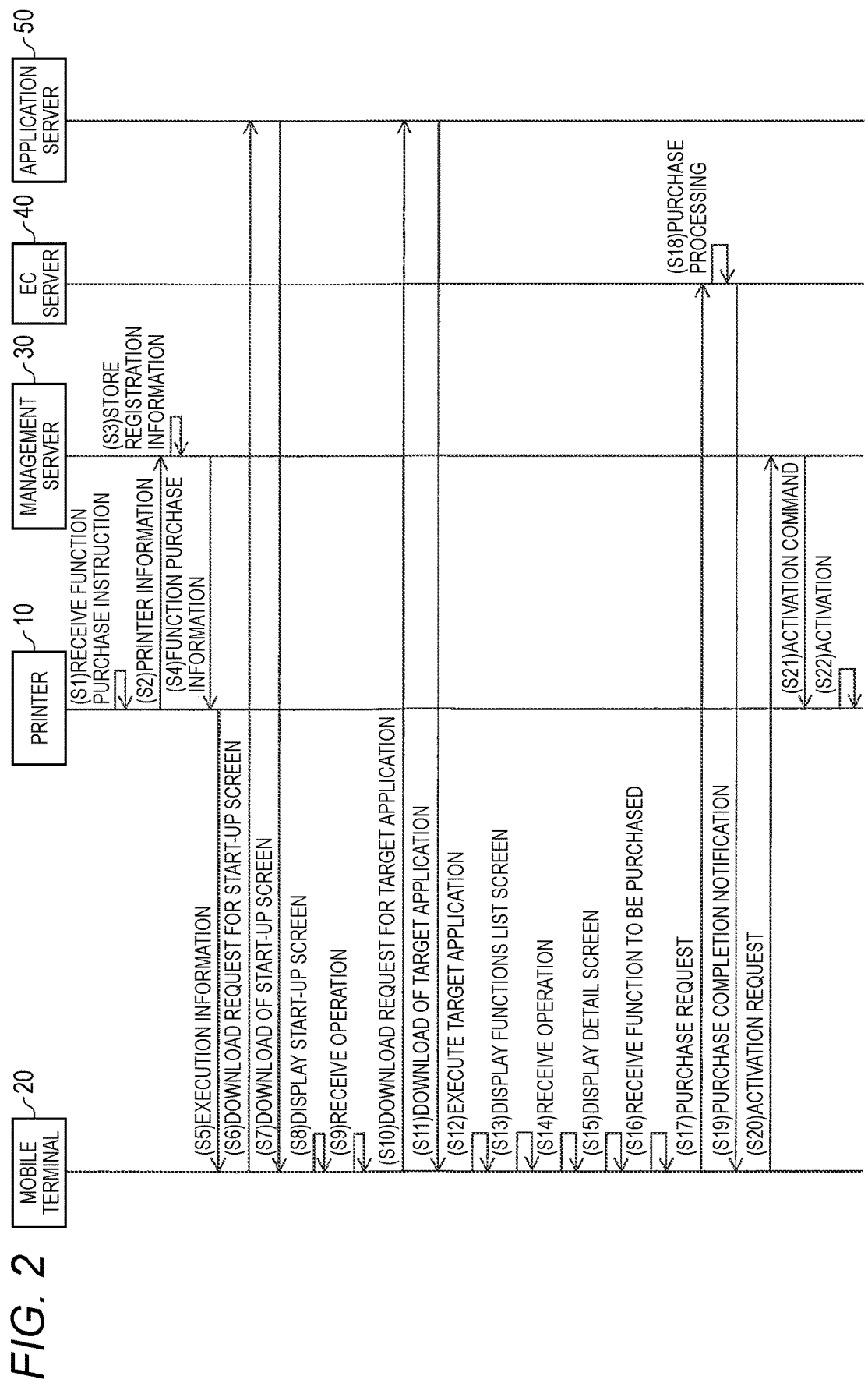
FIG. 2 is a sequence diagram showing an illustrative aspect of activating a function of a printer.

Subsequently, processing that is executed by each of the devices 10 to 50 is described with reference to a sequence diagram of FIG. 2. Note that, in the below, for easy understanding, when describing processing that is executed by the CPU 161 of the printer 10 in accordance with the program 163, the printer 10 is described as a subject, not the CPU 161. In addition, all communications that are performed by the printer 10 are performed via the communication interface 13. Therefore, when describing the communication, the description 'via the communication interface 13' is omitted. Similarly, the mobile terminal 20 and the management server 30 are described as subjects, the descriptions 'via the communication interface 24' and 'via the communication interface 31' are omitted. Further, in order to clarify whether the processing that is executed by the mobile terminal 20 is processing by the OS 253 or by the target application TA (App Clips), it is described as 'the OS 253 of the mobile terminal 20' or 'the target application TA of the mobile terminal 20', etc.

First, in S1, the printer 10 receives a function purchase instruction. In the present illustrative embodiment, the function purchase instruction is issued when the user operates a predetermined icon image on a home screen that is displayed on the display 12 of the printer 10. Note that, the home screen is a standby screen for waiting for an instruction from the user. It is also assumed that the user who operates the icon image in S1 carries the mobile terminal 20.

Then, in S2, the printer 10 transmits print information to the management server 30. The print information is information about the printer 10, and in the present illustrative embodiment, is information including at least a printer name of the printer 10. The printer name is information for identifying the printer 10. The printer name may include a value corresponding to a printer model type and a value inherent to each printer.

When the print information is received from the printer 10, the management server 30 generates registration information, in S3. Then, the management server 30 stores (registers) the generated registration information in the memory 322.

Figures 3, 4:
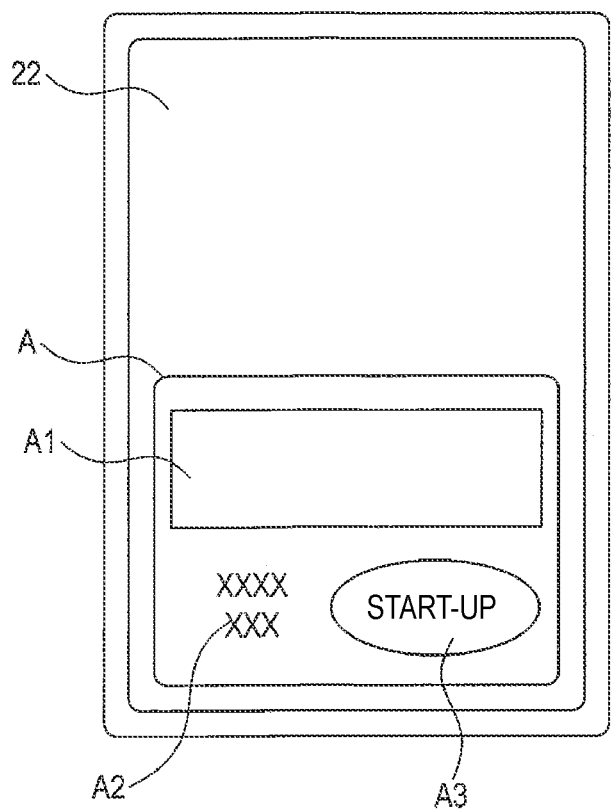
FIG. 3 shows registration information.
FIG. 4 shows a start-up screen.

Here, the registration information is information where a printer name, support function information and purchase information are associated, as shown in FIG. 3.

The printer name is as described above. In the registration information shown in FIG. 3, the printer name of the printer 10 is indicated as 'MFC-XXXX_123456_AAA'.

The support function information is information indicative of a function that is supported by the printer 10. The function that is supported by the printer 10 is a function of the printer 10 that can be used as a result of the user purchasing the function. In the present illustrative embodiment, the support function information is information indicating whether each function is 'supported' or 'not supported' by the printer 10. In the registration information shown in FIG. 3, the function that is supported by the printer 10 includes a cloud storage function, a color printing function, and the like.

The purchase information is information indicating a purchase status (i.e., purchase completed or not purchased) of each function that is supported by the printer 10.

In the present illustrative embodiment, the management server 30 holds information where a printer name and support function information are associated with each other for each of various printers that are sold by the vendor of the management server 30. When the printer name is received from the printer 10 in S2, the management server 30 refers to the information to obtain the corresponding support function information. The management server 30 also manages the purchase information for each printer that is sold by the vendor of the management server 30. When the printer name is received from the printer 10 in S2, the management server 30 obtains the purchase information of the printer having the received printer name. In S3, the management server 30 generates the registration information shown in FIG. 3, based on the printer name received from the printer 10 and the obtained support function information and purchase information, and registers the generated registration information in the memory 322.

Note that, when the registration information of the printer 10 is once registered in the management server 30, if the printer 10 thereafter receives the function purchase instruction in S1, the management server 30 only refers to the registration information in S3.

In S4, the management server 30 transmits function purchase information to the printer 10. As used herein, the function purchase information is information including both the support function information and the purchase information.

When the function purchase information is received from the management server 30, the printer 10 provides execution information to the mobile terminal 20, in S5.

The execution information is information for causing the mobile terminal 20 to download the target application TA and to execute the target application TA. In the present illustrative embodiment, the execution information includes URL information for download of the target application TA. The mobile terminal 20 can access the application server 50 by using the URL, and download the target application TA (App Clips).

In the present illustrative embodiment, the printer 10 provides the execution information to the mobile terminal 20 by displaying the code information such as a QR Code including the execution information on the display 12. The OS 253 of the mobile terminal 20 reads the code information by the reader 23, thereby obtaining the execution information.

In the present illustrative embodiment, the execution information includes the function purchase information. Specifically, the function purchase information is included as a query parameter of the URL for download of the target application TA, which is included in the execution information. That is, the printer 10 provides the mobile terminal 20 with the function purchase information, together with the execution information. Then, the mobile terminal 20 obtains the function purchase information together with the execution information. Note that, a content of a screen (a functions list screen B and the like, which will be described later) that is displayed on the mobile terminal 20 when the target application TA is downloaded from the application server 50 is changed by the query parameter corresponding to the function purchase information of the printer 10.

When the execution information is obtained, the OS 253 of the mobile terminal 20 transmits a download request for the start-up screen (Clip Card) of the target application TA to the application server 50 by using the URL included in the execution information, in S6.

Subsequently, the OS 253 of the mobile terminal 20 downloads the start-up screen of the target application TA from the application server 50, in 57.

When the start-up screen of the target application TA is downloaded, the OS 253 of the mobile terminal 20 displays a start-up screen A shown in FIG. 4 on the display 22, in S8. In the start-up screen A, a header image A1 and a descriptive text A2 relating to the target application TA and a start-up button A3 for downloading and executing the target application TA (App Clips) are displayed.

In S9, the OS 253 of the mobile terminal 20 receives an operation on the start-up button A3 from the user.

In S10, the OS 253 of the mobile terminal 20 transmits a download request for the target application TA to the application server 50 by using the URL included in the execution information.

In S11, the OS 253 of the mobile terminal 20 downloads the target application TA from the application server 50.

Subsequently, the OS 253 of the mobile terminal 20 executes (starts up) the target application TA (App Clips), in S12.

Figure 5:
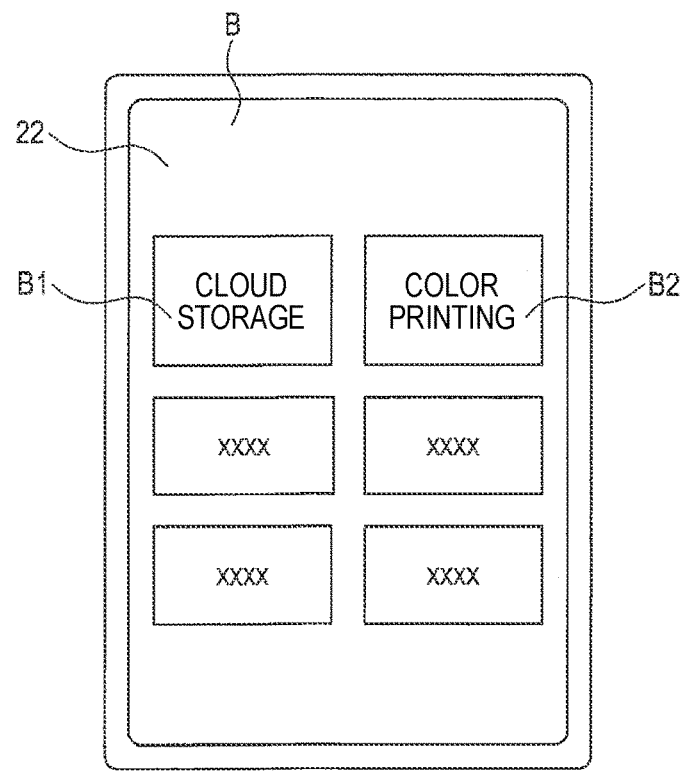
FIG. 5 shows a functions list screen.

When started up, the target application TA of the mobile terminal 20 displays a functions list screen B shown in FIG. 5 on the display 22, in S13.

The functions list screen B is a screen for displaying a list of functions of the printer 10. In the present illustrative embodiment, in the functions list screen B, a plurality of buttons B1 and 132 and the like on which names ('cloud storage function', 'color printing function' and the like) of functions of the printer 10, and the like are displayed, in the functions list screen B, the buttons B1 and B2 and the like are arranged and displayed. In addition, the functions list screen B is displayed over an entire screen of the display 22. However, the display aspect of the functions list screen B is not limited thereto. For example, the functions list screen B may be displayed in a part of the screen of the display 22.

In addition, in the functions list screen B of the present illustrative embodiment, a function that is supported by the printer 10 and a function that is not supported by the printer 10 are identifiably displayed. Similarly, the purchase completed function and the not-purchased function among the functions of the printer 10 are identifiably displayed. For example, the function that is not supported by the printer 10 and the purchase completed function may not be displayed or may be displayed in a displayed in a grayout form.

The display of the functions list screen B is implemented by the support function information and the purchase information that are provided to the mobile terminal 20 by the printer 10. That is, the functions list screen B is displayed by using the support function information and the purchase information, which are the query parameters of the URL for download of the target application TA.

Note that, in the functions list screen B, not only the name of each function of the printer 10 but also a brief description of each function may be displayed.

In S14, the target application TA of the mobile terminal 20 receives a user operation of selecting a function in the functions list screen B.

Figure 6:
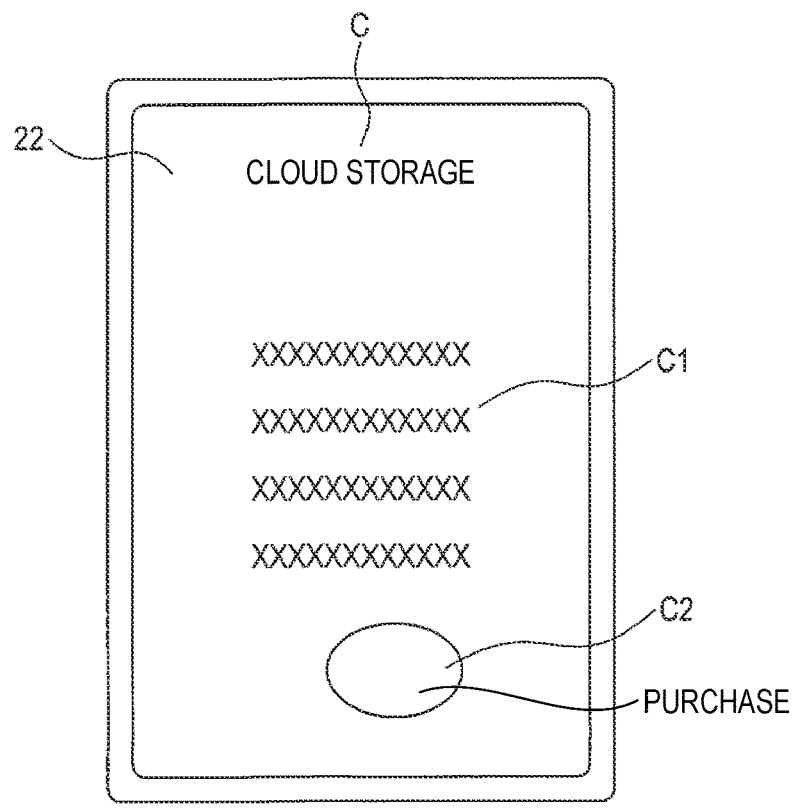
FIG. 6 shows a detail screen.

In S15, the target application TA of the mobile terminal 20 displays a detail screen C (refer to FIG. 6) relating to the function selected in S14 on the display 22. The detail screen C is a screen having a detail C1 of the operated function and a purchase button C2. As used herein, the detail C1 of the function is a more detail function description than the description of each function (for example, only the name of the function) displayed in the functions list screen B. The detail C1 may be configured by at least one of characters and an image.

Note that, the target application TA holds information indicative of a list of functions of the printer and details of each function. For this reason, the target application TA can display the functions list screen B showing the list of functions of the printer 10 and the detail screen C showing the details of each function without accessing the external web server.

Subsequently, the target application TA of the mobile terminal 20 receives a function to be purchased, in S16. In S16, it is assumed that the purchase button C2 of the detail screen C is operated.

Subsequently, the target application TA of the mobile terminal 20 transmits, to the EC server 40, a purchase request for the function (hereinafter, referred to as "target function") for which the purchase button C2 is operated in S16, in S17.

When the purchase request is received from the mobile terminal 20, the EC server 40 executes purchase processing of the target function, in S18. In the purchase processing, the sale information stored in the EC server 40 is referred to, and a price of the target function is obtained. Then, the obtained price is billed to the user, and payment of the billed price is performed.

Subsequently, in S19, the EC server 40 transmits a purchase completion notification, which indicates that the purchase of the target function is completed, to the mobile terminal 20. In the present illustrative embodiment, the purchase completion notification includes payment completion information indicative of a payment ID.

When the purchase completion notification is received from the EC server 40, the target application TA of the mobile terminal 20 transmits an activation request for requesting activation of the target function to the management server 30, in S20. The activation request includes the printer name of the printer 10 (i.e., a printer in which the function is activated), information capable of specifying the target function, and the payment completion information received in S19.

Subsequently, when the activation request is received from the mobile terminal 20, the management server 30 transmits an activation command to the printer 10, in S21. The activation command is a command for activating the target function in the printer 10. When the activation request is received from the mobile terminal 20, the management server 30 also changes the purchase information of the target function among the registration information of the printer 10 into 'purchased'.

When the activation command is received from the management server 30, the printer 10 activates the target function, in S22. Thereby, the user can use the additionally purchased function.

3. Effects

According to the illustrative embodiment as described above, following effects are achieved.

(1) In the present illustrative embodiment, the management server 30 receives the function purchase instruction via the printer 10, in S1 and S2. Then, when the function purchase instruction is received, the management server 30 provides the execution information to the mobile terminal 20 via the printer 10, in S4 and S5. The execution information is information for causing the mobile terminal 20 to download the target application TA and to execute the target application TA. The target application TA is an application for purchasing a function of the printer 10. Accordingly, it is possible to provide a novel method regarding a method of purchasing the function of the printer 10.

(2) In the present illustrative embodiment, the management server 30 receives the activation request, which indicates that a function of the printer 10 is purchased, from the mobile terminal 20 downloading the target application TA, in S20. When the activation request is received, the management server 30 activates the function of the printer 10, in S21.

Therefore, for example, as compared to a configuration where the user obtains a password for activating the function of the printer 10 and inputs the password into the printer 10 in a case where the user purchases the function of the printer 10, the certainty that the function of the printer 10 is activated can be improved. In addition, since the function is activated even though the user does not input the password, the user's convenience can be improved.

(3) In the present illustrative embodiment, the target application TA is an application configured to provide some functions of the main application MA. The main application MA is a predetermined application that can be executed in the mobile terminal 20. In particular, the main application MA is an application for causing the printer 10 to execute a predetermined function.

Therefore, it is possible to purchase a function of the printer 10 by using the target application TA without downloading the main application MA. Accordingly, as compared to a configuration where the main application MA is downloaded to purchase a function of the printer 10, it is possible to purchase the function of the printer 10 more simply and promptly.

(4) In the present illustrative embodiment, the management server 30 provides the mobile terminal 20 with the support function information and the purchase information via, the printer 10, in S4 and S5. The support function information and the purchase information are used when the target application TA displays the function that is supported by the printer 10 and the purchased function.

Therefore, the user can easily perceive the function that is supported by the printer 10 and the purchase status of each function. Accordingly, it is possible to improve the user's convenience. In addition, for example, as compared to a configuration where the mobile terminal 20 separately inquires of the management server 30 about the support function information and the purchase information, it is possible to save the communication cost of the mobile terminal 20.

(5) In the present illustrative embodiment, the execution information includes the support function information and the purchase information, as parameters. Therefore, the support function information and the purchase information are provided to the mobile terminal 20, together with the information for downloading and executing the target application TA. Accordingly, as compared to a configuration where only the information for downloading and executing the target application TA is provided to the mobile terminal 20 and the mobile terminal 20 separately inquires of the management server 30 about the support function information and the purchase information, it is possible to save the communication cost of the mobile terminal 20.

(6) In the present illustrative embodiment, the function purchase instruction to the printer 10 in S1 is issued when the user selects a predetermined icon image displayed on the display 12 of the printer 10. Therefore, when the user selects the icon image, the target application TA can be downloaded and executed and the function of the printer 10 can be purchased. Accordingly, it is possible to improve the users convenience.

(7) In the present illustrative embodiment, the purchasable functions of the printer 10 include both the color printing function and the cloud storage function. Therefore, it is possible to purchase both the color printing function and the cloud storage function of the printer 10 by the novel method of the present disclosure.

(8) In the present illustrative embodiment, the management server 30 displays the code information on the display 12 of the printer 10, thereby providing the execution information to the mobile terminal 20. Therefore, when the mobile terminal 20 has the reader 23 capable of reading the code information, the target application TA can be downloaded and executed.

(9) In the present illustrative embodiment, the target application TA is executed when the start-up screen A (refer to FIG. 4) displayed on the display 22 of the mobile terminal 20 is operated. Therefore, the target application TA is not downloaded and executed unless the user operates the start-up screen A. Accordingly, the user can determine whether or not to download and execute the target application TA.

(10) In the present illustrative embodiment, the target application TA receives the support function information and the purchase information from the management server 30 via the printer 10. Then, the target application TA displays the functions list screen B according to the received support function information and purchase information. Therefore, the user can easily perceive the function that is supported by the printer 10 and the purchase status of each function. Accordingly, it is possible to improve the user's convenience.

(11) In the present illustrative embodiment, the target application TA displays the detail screen C on the display 22 when the function displayed on the functions list screen B is operated. Therefore, the user can first check details of a function to be purchased and then purchase the function. Accordingly, it is possible to improve the user's convenience.

The present disclosure may provide an information processing apparatus including a reception unit and a provision unit. The reception unit may be configured to receive a function purchase instruction of an image forming apparatus. When the reception unit receives the function purchase instruction, the provision unit may provide execution information to a mobile terminal. The execution information may be information for downloading and executing a target application. The target application may be an application software for purchasing a function of the image forming apparatus.

Further, the present disclosure may provide an application for a mobile terminal. The application may be an application for purchasing a function of an image forming apparatus. When the image forming apparatus receives a function purchase instruction, execution information may be provided from a predetermined information processing apparatus to the mobile terminal. The execution information may be information for downloading and executing the application. The application may be downloaded and executed in the mobile terminal, on condition that the execution information is provided from the information processing apparatus to the mobile terminal.

Note that, in the present illustrative embodiment, the management server 30 corresponds to the information processing apparatus, the printer 10 corresponds to the image forming apparatus, the activation request corresponds to the purchase information, the target application TA corresponds to the application software, and the start-up screen A corresponds to the predetermined screen that is displayed on the display of the mobile terminal S1 and S2 correspond to the processing as the reception unit, S4 and S5 correspond to the processing as the provision unit, S5 corresponds to the processing as the function receiving processing, S13 corresponds to the processing as the list display processing, and S15 corresponds to the processing as the detail display processing. In addition, S17 corresponds to the processing as the purchase transmission processing, S19 corresponds to the processing as the completion receiving processing, S20 corresponds to the activation transmission processing and the processing as the receiving unit, and S21 corresponds to the processing as the activation unit.

4. Other Illustrative Embodiments

Although the illustrative embodiment of the present disclosure has been described, the present disclosure is not limited to the above illustrative embodiment and can be variously modified and implemented.

(1) In the above illustrative embodiment, the management server 30 has been exemplified as the information processing apparatus. However, the information processing apparatus is not limited thereto. The information processing apparatus may also be the printer 10. In this case, the printer 10 corresponds to the information processing apparatus and the image forming apparatus, the activation command corresponds to the purchase information, S1 corresponds to the processing as the reception unit, S5 corresponds to the processing as the provision unit, S21 corresponds to the processing as the receiving unit, and S22 corresponds to the processing as the activation unit. Note that, in a case where the information processing apparatus is the printer 10, the management server 30 may not be provided.

(2) In the above illustrative embodiment, the printer 10 may be configured to download a function purchased by the user from the management server 30 and activate the function.

(3) In the above illustrative embodiment, the detail screen C may not be displayed. In this case, for example, the explanation of each function is briefly described in the functions list screen B shown in FIG. 5, and when each function is operated on the functions list screen B, the purchase request for the function may be transmitted.

(4) In the above illustrative embodiment, the printer 10 may be configured to provide the code information to the mobile terminal 20 by printing the code information on a printing medium such as a sheet.

(5) In the above illustrative embodiment, the printer 10 provides the execution information to the mobile terminal 20 by displaying the code information on the display 12. However, the method of providing the execution information is not limited thereto. For example, the printer 10 may be configured to provide the execution information to the mobile terminal 20 by transmitting the execution information to the mobile terminal 20 by using the short-range wireless communication such as BT, BLE and NFC via the communication interface 13.

(6) In the above illustrative embodiment, only one of the color printing function and the cloud storage function may also be purchased. In addition, a function other than the color printing function and the cloud storage function can also be purchased. For example, a duplex printing function, an Nin1 printing function and the like can also be purchased. The Nin1 printing function is a function of printing images of N pages (N is an integer of 2 or greater) on one printing medium.

(7) In the above illustrative embodiment, when the execution information is obtained from the printer 10, the OS 253 of the mobile terminal 20 may download and execute the target application TA from the application server 50 without displaying the start-up screen A (Clip Card).

(8) In the above illustrative embodiment, 'App Clips' has been exemplified as the target application TA. However, the target application TA is not limited thereto. For example, the target application TA may also be 'Instant Apps' available from Google, Inc.

(9) In the above illustrative embodiment, the printer 10 may store at least one of the support function information and the purchase information of the printer 10. In S2, the printer 10 may transmit the printer information including the printer name and at least one of the support function information and the purchase information to the management server 30. In S3, the management server 30 may generate the registration information based on the printer name, the support function information, and the purchase information received from the printer 10. In this case, in S4, the function purchase information including information, which is not stored in the printer 10, of the support function information and the purchase information may be transmitted from the management server 30 to the printer 10.

(10) In S20 of the above illustrative embodiment, the mobile terminal 20 may directly transmit the activation request to the printer 10, not the management server 30. When the activation request is received from the mobile terminal 20, the printer 10 may activate the function.

(11) In the above illustrative embodiment, the registration processing (S3) of the registration information is executed after receiving the function purchase instruction (S1). However, the timing of executing the registration processing is not limited thereto.

For example, the registration processing may be executed before S1. In this case, for example, the registration processing may be executed at a time when purchasing the printer 10, at a time when the printer 10 is first started up, at a time when the printer 10 and the management server 30 are first connected, and the like. Alternatively, in a case where the management server 30 manages a printer and a user ID of the printer in association with each other, the registration processing may be executed at a time when the printer and the user ID are associated with each other.

Note that, in these cases, S4 may be executed via S1 and S2 of the above illustrative embodiment, without executing S3. Alternatively, instead of S3 (registration processing), processing of checking whether the support function information and the purchase function information received from the printer 10 by the management server 30 are matched with the support function information and the purchase function information already registered may be executed. Thereafter, S4 may be executed.

(12) In S5 of the above illustrative embodiment, the printer 10 provides the mobile terminal 20 with the support function information and the purchase function information together with the execution information. However, the printer 10 may provide only the execution information to the mobile terminal 20. In this case, for example, the mobile terminal 20 may obtain the execution information including the printer name in S5, transmit the obtained printer name to the management server 30, and obtain the support function information and the purchase function information of the printer 10 from the management server 30. That is, in the step where the functions list screen B is displayed on the display 22 as the target application TA is executed, the mobile terminal 20 may obtain the support function information and the purchase function information.

(13) In the above illustrative embodiment, the management server 30 may transmit information (a password and the like) for activating a function of the printer 10 to the mobile terminal 20. When the user inputs the password or the like to the printer 10, the function of the printer 10 may be activated. In this case, the transmission processing (S20) of the activation request from the mobile terminal 20 to the management server 30 and the transmission processing (S21) of the activation command from the management server 30 to the printer 10 may not be executed. In addition, the management server 30 may synchronize the status of the activation of the function with the printer 10, as required.

(14) In the above illustrative embodiment, in S19, the mobile terminal 20 directly receives the purchase completion notification from the EC server 40. However, the path along which the mobile terminal 20 receives the purchase completion notification is not limited thereto. For example, the purchase completion notification may be received by the mobile terminal 20 via the management server 30. In addition, the payment completion information may be received by the mobile terminal 20 via a server of a company that provides a payment service, other than the vendor of the EC server 40.

(15) In S19 of the above illustrative embodiment, the purchase completion notification is transmitted from the EC server 40 to the mobile terminal 20. However, the transmission destination of the purchase completion notification is not limited to the mobile terminal 20. For example, the purchase completion notification may be transmitted from the EC server 40 to the management server 30. When the purchase completion notification is received from the EC server 40, the management server 30 may transmit the activation command to the printer 10.

In this case, for example, the target application TA of the mobile terminal 20 transmits a purchase request and information (hereinafter, referred to as 'purchase request ID') capable of uniquely specifying the purchase request to the EC server 40, in S17. In addition, the target application TA of the mobile terminal 20 separately transmits the same purchase request ID, the printer name of the printer 10, and information of specifying a function to be purchased to the management server 30. Then, when the purchase completion notification relating to the purchase request ID received from the mobile terminal 20 is received from the EC server 40, the management server 30 may assume that the purchase of the function has been completed, and transmit the activation command to the printer 10.

(16) In the above illustrative embodiment, a function is purchased for each printer included in the communication system 1. However, for example, the function may be purchased for each user.

That is, the management server 30 associates the user ID with one or more printers that are used by the user of the user ID and manages them. When the user purchases a function of the printer, the function may be purchased for all the printers associated with the user ID of the user. In this case, the function of the printer 10 is purchased but the function of the printer 10 may not be activated. In this case, the user may individually activate the function of the printer 10.

Figure 7:
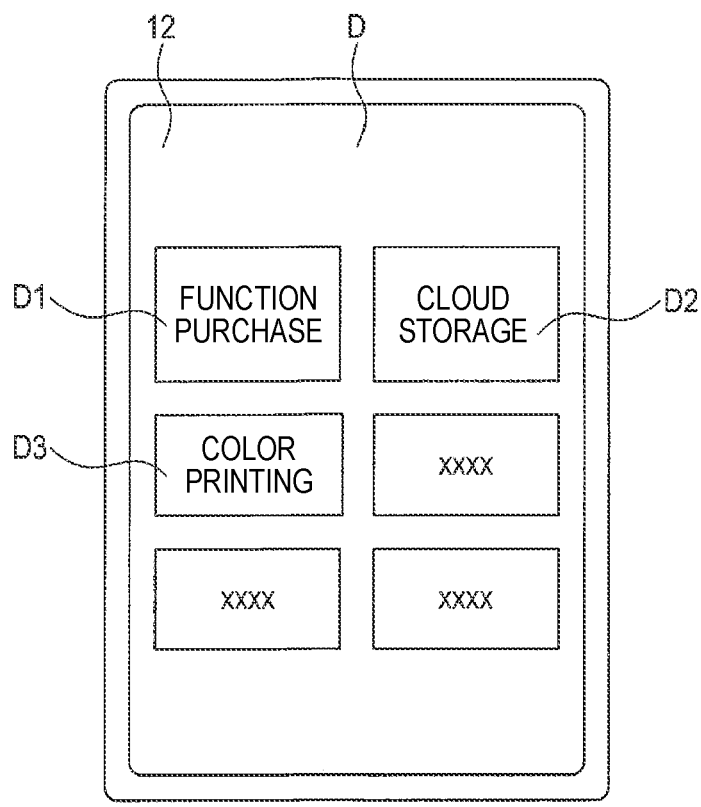
FIG. 7 shows a home screen that is displayed on a display of the printer.

(17) The communication system 1 may be configured as follows. Specifically, a home screen D shown in FIG. 7 is displayed on the display 12 of the printer 10. In the home screen D, an icon D1 for general function purchase of the printer 10 and icons D2 and D3 of specific functions (for example, a cloud storage function and a color printing function) not activated are displayed.

When the icon D1 is operated, the printer 10 receives a first function purchase instruction. As used herein, the first function purchase instruction is a function purchase instruction in which information of a specific function is not included, in other words, a function purchase instruction in which a specific function is not designated. When the first function purchase instruction is received, the printer 10 may provide first execution information to the mobile terminal

20. The first execution information is execution information for displaying the functions list screen B shown in FIG. 5 on the display 22 of the mobile terminal 20. That is, after the first execution information is provided, when the target application TA is executed, the functions list screen B is displayed on the display 22 of the mobile terminal 20.

On the other hand, when the icon D2 or D3 is operated, the printer 10 receives a second function purchase instruction. As used herein, the second function purchase instruction is a function purchase instruction in which information of a specific function (for example, a cloud storage function, a color printing function) is included. When the second function purchase instruction is received, the printer 10 may provide second execution information to the mobile terminal 20. The second execution information is execution information for displaying the detail screen C (refer to FIG. 6) relating to the specific function on the display 22 of the mobile terminal 20. That is, after the second execution information is provided, when the target application TA is executed, the detail screen C of the specific function is displayed without displaying the functions list screen B on the display 22 of the mobile terminal 20. The communication system 1 may be configured in this way. Note that, after purchasing a function, when the icon D2 or D3 is operated, the corresponding function (for example, a cloud storage function, a color printing function) is executed.

(18) Each of the devices 10, 20, 30, 40 and 50 and the methods thereof described in the present disclosure may be implemented by a dedicated computer including a processor programmed to execute one or more functions embodied by a computer program, and a memory. Alternatively, the devices 10, 20, 30, 40 and 50 and the methods thereof described in the present disclosure may be implemented by a dedicated computer including a processor configured by one or more dedicated hardware logic circuits. Alternatively, the devices 10, 20, 30, 40 and 50 and the methods thereof described in the present disclosure may be implemented by one or more dedicated computers configured by a combination of a processor programmed to execute one or more functions and a memory and a processor configured by one or more hardware logic circuits. In addition, the computer program may be recorded on a computer-readable non-transitory tangible recording medium, as instructions that are executed by a computer.

(19) In the above illustrative embodiment, the plurality of functions of one composition element may be implemented by the plurality of composition elements, or one function of one composition element may be implemented by the plurality of composition elements. In addition, the plurality of functions of the plurality of composition elements may be implemented by one composition element, or one function that is implemented by the plurality of composition element may be implemented by one composition element. Further, some of the configurations of the above illustrative embodiment may be omitted. In addition, at least some of the configurations of the above illustrative embodiment may be added or replaced with respect to the other illustrative embodiments.

(20) In addition to the devices 10, 20, 30, 40 and 50, the present disclosure can be implemented in a variety of forms such as a system having the devices 10, 20, 30, 40 and 50 as composition elements, a program for causing a computer to function as the devices 10, 20, 30, 40 and 50, a non-transitory tangible recording medium such as a semiconductor memory having the program recorded thereon, a method of purchasing and/or activating a function of the printer 10, and the like.

What is claimed is:

1. An information processing apparatus for purchasing a target function from a plurality of predetermined functions supported by an imaging forming apparatus, the information processing apparatus comprising:
   a controller configured to:
      receive a function purchase instruction being a user's instruction to purchase the target function of an image forming apparatus, and the target function is presently inactive for the image forming apparatus; and
      based on receiving the function purchase instruction, display a code information including execution information on the image forming apparatus, the execution information being for causing a mobile terminal to download a target application and to execute the target application, the target application being an application software for purchasing the target function of the image forming apparatus,
   wherein the target application is a mini application software that provides a purchase function being some functions of a main application, the main application being an application software for causing the image forming apparatus to execute at least one of the predetermined functions, the predetermined functions include a print function and a scan function,
   wherein the execution information includes URL information for download of the target application,
   wherein the target application is downloaded by the URL information of the execution information obtained by the mobile terminal reading the displayed code information
   wherein the controller is configured to provide the mobile terminal with support function information and purchase information, the support function information indicating each of the predetermined functions that are supported by the image forming apparatus, the purchase information indicating a purchase status of each of the predetermined functions that are supported by the image forming apparatus, and
   wherein, when the target application is activated, the target application provides a display screen on the mobile terminal that identifiably displays,
      a list of the predetermined functions supported by the image forming apparatus, and
      the purchase information for each of the predetermined functions supported by the image forming apparatus, the purchase information includes a respective one of a purchased status and a not-purchased status for each of the predetermined functions.

2. The information processing apparatus according to claim 1,
   wherein the controller is further configured to:
      receive an activation request from the mobile terminal on which the target application is downloaded, the activation request indicating purchase of the target function of the image forming apparatus; and
      based on receiving the purchase information, activate the target function of the image forming apparatus.

3. The information processing apparatus according to claim 1,
   wherein the target application is an application software that provides the some functions of the main application, the main application being a predetermined application software that can be executed in the mobile terminal.

4. The information processing apparatus according to claim 3,
wherein the target application is App Clips.

5. The information processing apparatus according to claim 1,
wherein the function purchase instruction is issued through a user's operation on a predetermined icon image displayed on a display of the image forming apparatus.

6. The information processing apparatus according to claim 1,
wherein the execution information includes the support function information and the purchase information as parameters.

7. The information processing apparatus according to claim 1,
wherein the controller is further configured to:
in a case the image forming apparatus receives a first function purchase instruction not including information of a specific function of the predetermined functions, provide first execution information to the mobile terminal, the first execution information being for displaying a functions list screen displaying a list of the predetermined functions of the image forming apparatus on a display of the mobile terminal; and
in a case the image forming apparatus receives a second function purchase instruction including the information of the specific function, provide second execution information to the mobile terminal, the second execution information being for displaying a detail screen having a detail of the specific function and a purchase button on the display of the mobile terminal.

8. The information processing apparatus according to claim 7,
wherein the first function purchase instruction is issued through a user's operation on an icon image for general function purchase displayed on a display of the image forming apparatus, and
wherein the second function purchase instruction is issued through a user's operation an icon image of the non-activated specific function displayed on the display of the image forming apparatus.

9. The information processing apparatus according to claim 1,
wherein target function purchasable with the target application among the predetermined functions of the image forming apparatus comprises at least one of a color printing function and a cloud storage function.

10. The information processing apparatus according to claim 1,
wherein the information processing apparatus is a server separated from the image forming apparatus.

11. The information processing apparatus according to claim 1,
wherein the controller is configured to provide the execution information by displaying the code information in which the execution information is coded on a display of the image forming apparatus.

12. A non-transitory computer-readable medium storing a computer program readable by a computer of a mobile terminal, the computer program, when executed by the computer, causes the mobile terminal to perform:

based on an image forming apparatus receiving a function purchase instruction, displaying, on the image forming apparatus, a code information,
the code information including execution information, and
the execution information from an information processing apparatus, the execution information being for causing the mobile terminal to download an application software for the mobile terminal and to execute the application software, the application software being for purchasing a target function of the image forming apparatus, the target function is one of plurality of predetermined functions that are supported by the image forming apparatus, and the target function is presently inactive for the image forming apparatus,
the function purchase instruction being a user's instruction to purchase the function of the image forming apparatus; and
on a condition that the execution information has been received from the information processing apparatus, downloading and executing the application software,
wherein the application software is a mini application software that provides a purchase function being some functions of a main application, the main application being an application software for causing the image forming apparatus to execute at least one of the predetermined functions, the predetermined functions include a print function and a scan function,
wherein the execution information includes URL information for download of the application software, and
wherein the application software is downloaded by the URL information of the execution information obtained by the mobile terminal reading the displayed code information wherein the computer program, when executed by the computer, causes the mobile terminal to perform,
executing the application software,
wherein the application software, when executed by the computer, causes the mobile terminal to perform:
receiving support function information and purchase information from the information processing apparatus, the support function information indicating a function supported by the image forming apparatus, and the purchase information indicating a purchase status of a function of the image forming apparatus; and
based on the received support function information and the purchase information, displaying a functions list screen on a display of the mobile terminal, the functions list screen including,
a list of the predetermined functions supported by the image forming apparatus, and
the purchase information for each of the predetermined functions supported by the image forming apparatus, the purchase information includes a respective one of a purchased status and a not-purchased status for each of the predetermined functions.

13. The non-transitory computer-readable medium according to claim 12,
wherein the application software is started up in a case a predetermined screen displayed on a display of the mobile terminal is operated after the execution information is received.

14. The non-transitory computer-readable medium according to claim 12, wherein based on receiving a user's operation on an icon representing the target function and displayed on the functions list screen, the application software, when executed by the computer, further causes the mobile terminal to perform displaying a detail screen on the display, the detail screen including a detail of the operated target function and a purchase button.

15. The non-transitory computer-readable medium according to claim 12,
wherein the application software, when executed by the computer, further causes the mobile terminal to perform:
transmitting a purchase request to an EC server, the purchase request requesting purchase of the target function of the image forming apparatus;
receiving a purchase completion notification from the EC server, the purchase completion notification indicating that purchase of the target function of the image forming apparatus is completed; and
based on receiving the purchase completion notification, transmitting an activation request to the information processing apparatus, the activation request requesting activation of the target function of the image forming apparatus.

16. The non-transitory computer-readable medium according to claim 12,
wherein the application software is configured to provide the some functions of the main application, the main application being a predetermined application software that can be executed in the mobile terminal.

17. The non-transitory computer-readable medium according to claim 16,
wherein the application software is App Clips.

* * * * *